United States Patent [19]

Fenoglio et al.

[11] Patent Number: 4,973,660

[45] Date of Patent: Nov. 27, 1990

[54] POLYAMIDE OF DIAMINO-T-BUTYLTOLUENE

[75] Inventors: David J. Fenoglio, Wheaton; Douglas E. Fjare; John L. Melquist, both of Naperville, all of Ill.

[73] Assignee: Amoco Corporation, Chicago, Ill.

[21] Appl. No.: 277,788

[22] Filed: Nov. 30, 1988

[51] Int. Cl.$^5$ .................. C08G 69/32; C08G 69/26
[52] U.S. Cl. .................................. 528/349; 528/208; 528/344; 528/348
[58] Field of Search ................ 528/349, 348, 344, 208

[56] References Cited

U.S. PATENT DOCUMENTS 4,245,066  1/1981  Nakagawa et al. .................. 528/349
4,690,999  9/1987  Numata et al. ...................... 528/188

*Primary Examiner*—Harold D. Anderson
*Attorney, Agent, or Firm*—Frederick S. Jerome; William H. Magidson; Ralph C. Medhurst

[57] ABSTRACT

Resinous condensation polymers of polycarboxylic acid compounds and aromatic diprimary amines comprising diamino-t-butyltoluene are described. In particular, film-forming polyamides, polyimides and polyamide-imides and their copolymers made using diamino-t-butyltoluene which have amino groups meta or para to each other on a benzene ring are described. These polymers have some solubility in organic solvents such as N-methylpyrrolidone, a high glass transition temperature, excellent thermal stability, and are useful in films, fibers and composites, and in the electronics industry as electrical component substrates, protective coatings, interlevel dielectrics and the like.

8 Claims, No Drawings

POLYAMIDE OF DIAMINO-T-BUTYLTOLUENE

BACKGROUND OF THE INVENTION

This invention relates to resinous condensation polymers of polycarboxylic acid compounds and aromatic diprimary amines comprising diamino-t-butyltoluene. More particularly, this invention relates to soluble, film-forming polyamides, polyimides and polyamide-imides made using diamino-t-butyltoluenes which have amino groups meta or para to each other on a benzene ring.

Aromatic polyamides, polyimides and polyamide-imides have found extensive use in industry as fibers, composites, molded parts and dielectrics due to their toughness, flexibility, mechanical strength and high thermal stability, and, in the case of polyimides, their lower dielectric constant and high electrical resistivity. Such polymers have been used in both film and coating form as advanced materials for such uses as passivation and insulating coatings, interlevel dielectrics, die attach adhesives, flexible circuit substrates, and the like.

Although current polyamides, polyimides, and polyamide-imides made from, for instance, metaphenylenediamine, have the toughness, flexibility and thermal stability necessary to meet the rigorous processing and operating conditions required for certain uses, they do not exhibit the low dielectric constant and reduced moisture uptake shown by lower thermal stability polymers such as polyethylene and polytetrafluoroethylene. The latter polymers, however, are not useful despite their excellent dielectric and moisture uptake properties if thermal stability requirements are demanding. A further difficulty limiting the usefulness of polyethylene and polytetrafluoroethylene is due to their insolubility in commercial organic solvents.

In addition, many of these applications require deposition of polymer from a solvent in order to form a thin film having the desired properties. Unfortunately, many polyamides, polyamide-imides and particularly polyimides are generally insoluble even in solvents like N-methyl pyrrolidone or N,N-dimethylacetamide, which inhibits their usefulness in important areas.

OBJECTS OF THE INVENTION

A general object of this invention is to produce a new resinous condensation polymer of a polycarboxylic acid compound and an aromatic diprimary amine comprising a diamino-t-butyltoluene useful as a film-forming polymer.

Another general object of this invention is to produce a new resinous condensation polymer composition exhibiting a combination of low dielectric constant, low moisture uptake, partial solubility in highly polar organic solvents, and thermal stability.

A more specific object of this invention is to provide improved polyamides, polyimides, and polyamide-imides made using diamino-t-butyltoluene which have amino groups meta or para to each other on the benzene ring.

Other objects and advantages of the invention will become apparent upon reading the following detailed description and appended claims.

SUMMARY OF THE INVENTION

The general objects of this invention can be attained with a resinous condensation polymer of a polycarboxylic acid compound and an aromatic diprimary amine comprising a diamino-t-butyltoluene. In preferred polymers of this invention the diprimary amine is at least one diamino-t-butyltoluene having amino groups meta or para to each other on the benzene ring.

In another aspect, the invention is an at least partially soluble, film-forming polyamide, polyimide, and polyamide-imide of an appropriately selected polycarboxylic acid compound and at least one diamino-t-butyltoluene selected from the group consisting of 3,5-diamino-2-t-butyltoluene, 3,6-diamino-2-t-butyltoluene, 4,6-diamino-2-t-butyltoluene, 2,4-diamino-3-t-butyltoluene, 2,5-diamino-3-t-butyltoluene, 2,6-diamino-3-t-butyltoluene, 4,6-diamino-3-t-butyltoluene, 2,5-diamino-4-t-butyltoluene, 3,5-diamino-4-t-butyltoluene, and 2,6-diamino-4-t-butyltoluene.

DETAILED DESCRIPTION OF THE INVENTION

The condensation polymers of the present invention can be prepared from an appropriately selected polycarboxylic acid compound and an aromatic diprimary amine comprising a diamino-t-butyltoluene.

The polymers of this invention are polyamides when they are formed by reaction of the diamino-t-butyltoluene with carboxylic diacids, diesters, and diacyl chlorides. Suitable carboxylic acid compounds include terephthalic acid, isophthalic acid, 2,6-naphthalenedicarboxylic acid, 5-t-butylisophthalic acid, the dimethyl ester of 2,6-naphthalenedicarboxylic acid, etc., the diacyl chlorides of benzene, t-butylbenzene, biphenyl, diphenylether, and naphthalene. Preferably, the polyamide is made from the diacyl chloride of biphenyl, t-butylbenzene, diphenylether, or naphthalene. More preferably, the polyamide is made from 5-t-butylisophthaloyl dichloride or 2,6-naphthoyl dichloride.

The polymers of this invention are polyimides when they are formed by reaction of the diamino-t-butyltoluene with aromatic dianhydrides or their corresponding carboxylic acids or esters. The aromatic dianhydrides useful in this invention include the symmetrical dianhydrides of benzene (PMDA), naphthalene, biphenyl (BPDA), diphenylether (OPAN), benzophenone (BTDA), bis(3,4-dicarboxyphenyl)sulfone dianhydride (SPAN), 2,2-bis(3,4-dicarboxyphenyl)propane dianhydride (IPAN), or 2,2-bis(3,4-dicarboxyphenyl)hexafluoropropane dianhydride (6FDA). Preferred polyimides of this invention are made from the symmetrical dianhydride of biphenyl tetracarboxylic acid, diphenylether tetracarboxylic acid, or benzophenone tetracarboxylic acid, 2,2-bis(3,4-carboxyphenyl)propane dianhydride, or 2,2-bis(3,4-carboxyphenyl)hexafluoropropane dianhydride. More preferably, the polyimide is made from 2,2-bis(3,4-dicarboxyphenyl)propane dianhydride, tetracarboxybiphenyl dianhydride, or 2,2-bis(3,4-carboxyphenyl)hexafluoropropane dianhydride.

The polymers of this invention are polyamide-imides when they are formed by reaction of the diamino-t-butyltoluene with the acyl chloride of trimellitic acid anhydride (TMAC), or mixtures of di and tetra functional polycarboxylic acid compounds.

All of these resinous condensation polymers are at least partially soluble in highly polar organic solvents such as N-methylpyrrolidone (NMP), gamma-butyrolactone (GBL), and N,N-dimethylacetamide, (DMAC). The solubility of these polymers provides processability, for example, in film-forming. Typically, polymer concentrations upward from about 1 weight percent are useful in film forming using highly polar solvents. Any particulates or insolubles in the polymer due to formation of a gel or cross-linking can be partitioned out, for example, by filtration, before casting.

Briefly, the resinous condensation polymers of this invention can be made by any technique used in the prior art to form polyamide, polyimide and polyamide-imide polymers provided the aromatic diprimary amines employed comprise at least one diamino-t-butyltoluene.

Diprimary amines useful in this invention include diamino-t-butyltoluenes which have amino groups meta or para to each other on a benzene ring, i.e., 3,5-diamino-2-t-butyltoluene, 3,6-diamino-2-t-butyltoluene, 4,6-diamino-2-t-butyltoluene, 2,4-diamino-3-t-butyltoluene, 2,5-diamino-3-t-butyltoluene, 2,6-diamino-3-t-butyltoluene, 4,6-diamino-3-t-butyltoluene. 2,5-diamino-4-t-butyltoluene, 3,5-diamino-4-t-butyltoluene, and 2,6-diamino-4-t-butyltoluene.

In the formation of resinous condensation polymers of this invention, a diamino-t-butyltoluene may be used alone or in conjunction with aliphatic diamines or other aromatic diamines. Suitable aliphatic amines contain 2 to about 12 carbon atoms, e.g., ethylenediamine, trimethylenediamine, hexamethylenediamine, dodecamethylenediamine, etc. In those cases where an aliphatic diamine containing 3 to 12 carbon atoms comprises more than 10 to 20 weight percent of the diprimary amine, the reaction product has a lower melting point and/or higher solubility than product produced from all aromatic amines.

Suitable aromatic diamines include metaphenylenediamine, oxybisaniline, methylenebisaniline, 4,4'-diaminodiphenyl propane, diaminodiphenylsulfide, 4,4'-diaminodiphenylsulfone, 3,4'-diaminodiphenylsulfone, 4,4'-diaminobenzopheneone, toluenediamine, metaxylene diamine, etc. Generally, the diamino-t-butyltoluene can range from about 5 mol % to 100 mol %, preferably at least 20 mol %, of the total diamines. Typically, for best results it is preferable to use only aromatic diamines since the thermal properties of the polymers decrease when aliphatic diamines are employed.

The diamino-t-butyltoluene can be any reasonably pure source of diamino-t-butyltoluene, preferably polymer grade having a purity of 98% or higher. For example, a suitable 2,6-diamino-4-t-butyltoluene is prepared by a process comprising alkylation of toluene with isobutene; nitration of the resultant p-t-butyltoluene; recovery and purification of 2,6-dinitro-4-t-butyltoluene, as, for example, by washing, extraction and/or crystallization using water and/or organic compounds such as alkanes or alcohols; hydrogenation of purified 2,6-dinitro-4-t-butyltoluene; and recovery and, if desired, purification of 2,6-diamino-4-t-butyltoluene. Hexane and ethanol are preferred organic compounds used in purifications by washing, extraction and/or crystallization. Typically, best results are obtained when the source of diamino-t-butyltoluene used is chosen to reduce the content of foreign aromatic compounds in the reaction mix.

In somewhat greater detail, polymers of this invention are preferably made by dissolving an aromatic diamine, preferably polymer grade diamine, in a solvent such as N-methylpyrrolidone or N,N-dimethylacetamide and adding carboxylic acid compound at a temperature between about 0° C. and 100° C., preferably in a range from about 10° to about 40° C., to make a solution of the polymer. When polyimides or polyamideimides are made, a second stage of reaction is required to imidize the amic acid groups. Imidization can be accomplished either thermally, preferably at temperatures in a range from about 200° to about 400° C., or chemically, preferably using pyridine and acetic anhydride. Typically, solutions of the polymer from about 5 to about 50 weight percent, preferably about 10 to about 40 weight percent, are employed.

In general, the molar ratio of diamine to carboxylic acid compound can range from about 1.2:1 to about 1:1.2. However, best results are attained using substantially equal molar portions of the diamine and the acidic component in making the polymer, although a small excess of one or the other component, or even a monofunctional compound, can be used in order to terminate the polymer with either acidic or amine groups to control molecular weight.

The resulting solution of polyamic acid polymer can be spread on a substrate and the solvent evaporated leaving the polyamic acid polymer in the form of a layer or coating. Any particulates or insolubles in the polyamic acid polymer due to formation of a gel or cross-linking can be partitioned out, for example, by filtration, before coating. The coating or film in the case of a polyimide is then heated, preferably in an inert gas such as nitrogen, to complete the imidization process. Films and coatings of the polymers are desirably thin, preferably between about 1 and about 20 microns in thickness, more preferably between about 1 and about 10 microns.

The polymers of this invention are useful as fibers, composites, and the like, and both free-standing films and coatings can be made in the form of flexible substrates for electrical components, interlevel dielectrics, passivation, etc.

The polyamides, polyimides, and polyamide-imides of this invention have high glass transition temperature, preferably above about 300° C.; high temperature of onset of degradation in nitrogen, preferably above about 450° C.; at least partial solubility in organic solvents, preferably at least about 15 weight percent in N-methylpyrrolidone for the polyamides, preferably at least about 10 weight percent in N-methylpyrrolidone for the polyamideimides, and preferably at least about 1 weight percent in N-methylpyrrolidone for the polyimides. They also have lower density, preferably at least less than 1.3 g/cc, and lower uptake of moisture at 100% relative humidity (R.H.), preferably less than about 2 weight percent for the polyimides, preferably less than about 5 weight percent for the polyamideimides, and preferably less than about 8 weight percent for the polyamides.

The following Examples will serve to illustrate certain embodiments of the herein disclosed invention. These Examples should not, however, be construed as limiting the scope of the novel invention as there are many variations which may be made thereon without departing from the spirit of the disclosed invention, as those of skill in the art will recognize.

EXAMPLES

General

All percents used are weight percents. Test procedures used to characterize the polymers of this invention are follows:

Dielectric Constant

Measurements of dielectric constant were made on thin films (0.7 to 2 mils thick) cast from polyamic acid solutions onto glass plates and thermally cured. The measurements were made using a two-fluid cell technique as described in ASTM D150. The reproducibility of the dielectric constant measurement using this technique is about ±2%.

Moisture Absorption and Change in Dielectric Constant

Moisture absorption measurements were made on wafer-level capacitor structures. Three-layer structures of aluminum/polymer/aluminum were fabricated on silicon wafers as set forth in U.S. Ser. No. 212,511, filed on June 28, 1988 now abandoned. Aluminum thickness was 0.6 microns, polymer thickness was 1 to 2 microns, and capacitor size was 0.01 square centimeters. Capacitance of the structures was measured between 50° C. and 300° C. over a range of frequencies. The capacitors were tested to 300° C., allowed to cool, and immediately reheated to 300° C. The moisture absorption values were calculated based on the difference between the measured 1 MHz dielectric constants at 50° C. for the first and second heats of the test according to the formula:

Equilibrium Moisture $$(100\% \text{ R.H.}) \approx \frac{2\Delta\epsilon}{0.4}$$

which formula is based upon 2 percent equilibrium moisture per unit change in epsilon, and where $\Delta\epsilon$ is the change in dielectric constant between first and second heat. The start of the first heat is assumed to be at 40% R.H. as the wafers were allowed to equilibrate for two days at 40% R.H. prior to testing. The start of the second heat is assumed to be approximately 0% R.H. as the wafers were reheated immediately after the water was driven off during the first heat. The change in dielectric constant at 40% R.H. is the percent difference between the measured 1 MHz dielectric constants at 50° C. for the first and second heats of the test.

Glass Transition Temperature

The glass transition temperature ($T_g$) of the polymers was measured by differential scanning calorimetry. A temperature ramp rate of 20° C./min was used for all determinations unless otherwise specified.

Temperature of Onset of Degradation

The temperature of onset of degradation (TGA) of the polymers was measured by thermogravimetric analysis in air and nitrogen. The onset temperature is the temperature at which 1 weight percent weight loss is found at a heating rate of 10° C./min. Measurements were made on thin films cast from polymer solutions onto glass plates and thermally cured.

The diamine, 2,6-diamino-4-t-butyltoluene, was prepared from toluene. Alkylation of toluene with isobutene gave p-t-butyltoluene which was then nitrated to give 2,6-dinitro-4-t-butyltoluene. Reduction of the dinitro compound produced the diamine.

Example 1

In this example, 2,6-diamino-t-butyltoluene was prepared from p-t-butyltoluene by a process comprising nitration and hydrogenation.

A mixed acid nitrating medium was prepared containing nitric acid (196.1 g of 70% $HNO_3$) and sulfuric acid (238 mL of conc. $H_2SO_4$). Then p-t-butylbenzene (296.5 g, 2.0 moles) was placed into a 1 L, 3-necked, round-bottom flask, and cooled to a temperature below 5° C. and vigorously stirred while the nitrating medium was added to the flask over a 20 min period. After an additional 1 hr period of mixing at a temperature below 5° C., the solution was allowed to separate and the aqueous (bottom) layer was drawn off and discarded. This nitration process was repeated twice more at temperatures in the range from 25° to 30° C. using a mixed acid nitrating medium containing nitric acid (196.1 g of 70% $HNO_3$) and sulfuric acid (238 mL of conc. $H_2SO_4$).

The organic product was washed with water, aqueous bicarbonate, and then more water; it was then triturated three times with pentane, leaving 300.7 g of 98.7% pure 2,6-dinitro-4-t-butyltoluene.

A portion of this 2,4-dinitro-t-butylbenzene (100 g), ethanol (500 mL) and a hydrogenation catalyst (5 g of 1% Pd/C) were placed in a one-liter autoclave which was purged with nitrogen and pressurized to 500 psig with hydrogen. The temperature of the autoclave containing the reaction slurry was raised to 75° C. and held at 75° C. for 1 hr to complete the reduction reaction.

After the autoclave cooled to room temperature and the pressure released, the solution was filtered to remove the solid catalyst. A crude product was recovered from the solvent by stripping under vacuum from the catalyst and evaporated to dryness to give 74.04 g of 98.3% pure 2,6-diamino-4-t-butyltoluene.

The 2,6-diamino-4-t-butyltoluene prepared above was purified by vacuum distillation. Product was collected at 110°–115° C. at 0.05 mm Hg pressure. The purity was determined to be 99.63 mole % by DSC (mp=97.3° C.).

Analysis for $C_{11}H_{18}N_2$:

% Calculated: C, 74.11; H, 10.18; N, 15.71

% Found: C, 74.10; H, 10.11; N, 15.83.

Examples 2–5

Purified 2,6-diamino-4-t-butyltoluene prepared as in Example 1 above was used to prepare new polyamides and polyaramides using various dicarboxylic acids. Polyaramides were prepared from 2,6-diamino-4-t-butyltoluene and terephthaloyl chloride, isophthaloyl chloride, or 5-t-butylisophthaloyl chloride. A polyamide was made from 2,6-diamino-4-t-butyltoluene and adipoyl chloride.

Comparisons of thermal properties were made for polyaramides and polyamides with 2,6-diaminotoluene. The effect of the t-butyl moiety was found to increase the glass transition temperature for all polymer comparisons.

These polymer preparations were run in solution using equimolar amounts of the acid chloride and diamine. The solvent used was N,N-dimethylacetamide (DMAC).

Example 2

Into a flame-dried, 500 ml 3-necked, round-bottomed flask equipped with a thermometer-nitrogen inlet tube and stirrer was placed 10.68 g (0.06 mole) of 2,6-diamino-4-t-butyltoluene and 129 g of N,N-dimethylacetamide. This mixture was cooled to 10° C. under nitrogen with mixing. During a 30 min period, 12.18 g (0.06 mol) of solid isophthaloyl chloride were added to the mixture while maintaining a temperature of no greater than 10° C. The mixture was then allowed to come to room temperature with mixing and heated to 50° C. for 3 hrs. The resulting polymer was precipitated and washed with water. After drying, 16.48 g (90% yield) of a white fluffy solid were obtained. This material had an inherent viscosity of 0.79 dL/g in $H_2SO_4$ (0.4 wt. %) at 30° C. The glass transition temperature was found to be 291° C. as measured by DSC. Thermal gravimetric analysis found 1% decomposition in nitrogen at 422° C. and in air at 373° C.

Example 3

In a manner similar to Example 2 above, 10.68 g of 2,6-diamino-4-t-butyltoluene were reacted with 15.54 g of 5-t-butylisophthaloyl dichloride in 148 g of N,N'-dimethylacetamide. After drying, 20.76 g (95% yield) of a white fluffy solid were obtained. This material had an inherent viscosity of 0.69 dL/g in DMAC (0.4 wt. %) at 30° C. The glass transition temperature was found to be 307° C. as measured by DSC. Thermal gravimetric analysis found 1% decomposition in nitrogen at 431° C. and in air at 371° C.

Example 4

In a manner similar to Example 2, 10.68 g (0.06 mol) of 2,6-diamino-4-t-butyltoluene was reacted with 12.18 g (0.06 mol) of terephthaloyl dichloride in 129 g of N,N'-dimethylacetamide. The resulting polyamide had an inherent viscosity of 0.98 dL/g. in $H_2SO_4$ (0.4 wt. %) at 30° C. The glass transition temperature of the polyamide was found to be 344° C. as measured by DSC. Thermal gravimetric analysis found 1% decomposition in nitrogen at 459° C. and in air at 377° C.

Example 5

Into a flame-dried, 500 mL, 3-necked, round-bottomed flask equipped with a thermometer-nitrogen inlet tube, stirrer, and pressure-equalized dropping funnel (with a drying tube) was placed 10.68 g (0.06 mole) of 2,6-diamino-4-t-butyltoluene and 122 g of N,N-dimethylacetamide. These were mixed and cooled to 10° C. Then 10.98 g (0.06 mole) of adipoyl chloride were slowly added to the stirred mixture while maintaining a temperature of less than 10° C. The mixture was then allowed to warm to room temperature and stirred for 3 hr. The resulting polymer is then precipitated and washed with water. After drying, 15.8 g (91.4%) of a powdery solid were obtained. The material had an inherent viscosity of 0.49 as measured in sulfuric acid (0.4 wt. %) at 30° C. The glass transition temperature was found to be 190° C. as measured by DSC. Thermal gravimetric analysis found 1% decomposition in nitrogen at 371° C. and in air at 345° C.

Comparative Examples A–D

For comparison of polymer properties, polyaramides and polyamides were prepared using 2,6-diaminotoluene and the acid chloride used in corresponding Examples 2–5 made using 2,6-diamino-4-t-butyltoluene. The results are shown in the Table.

Comparative Example A

In the manner described above, 7.32 g (0.06 mol) of 2,6-diaminotoluene were reacted with 12.18 g (0.06 mol) of isophthaloyl dichloride in 58.59 g of N,N'-dimethylacetamide. After drying, 13.3 g (88% yield) of a white fluffy solid were obtained. This material had an inherent viscosity of 0.69 dL/g in DMAC (0.4 wt. %) at 30° C. The glass transition temperature was found to be 268° C. as measured by DSC. Thermal gravimetric analysis found 1% decomposition in nitrogen at 385° C. and in air at 362° C.

Comparative Example B

In the manner described above, 7.32 g (0.06 mol) of 2,6-diaminotoluene were reacted with 15.54 g (0.06 mol) of 5-t-butylisophthaloyl dichloride in 68.6 g of N,N'-dimethylacetamide. After drying, 15.9 g (86% yield) of a white fluffy solid were obtained. This material had an inherent viscosity of 0.60 dL/g in DMAC (0.4 wt. %) at 30° C. The glass transition temperature was found to be 295° C. as measured by DSC. Thermal gravimetric analysis found 1% decomposition in nitrogen at 382° C. and in air at 373° C.

Comparative Example C

In the manner described above, 7.32 (0.06 mol) of 2,6-diaminotoluene were reacted with 12.18 g (0.06 mol) of terephthaloyl dichloride in 110 g of N,N'-dimethylacetamide. After drying, 14.29 g (95% yield) of a white fluffy solid were obtained. This material had an inherent viscosity of 1.4 dL/g in $H_2SO_4$ (0.4 wt. %) at 30° C. The glass transition temperature was found to be 297° C. as measured by DSC. Thermal gravimetric analysis found 1% decomposition in nitrogen at 422° C. and in air at 387° C.

Comparative Example D

In the manner described above, 7.32 (0.06 mol) of 2,6-diaminotoluene was reacted with 10.98 g (0.06 mol) of adipoyl chloride in 73 g of N,N'-dimethylacetamide. After drying, 12.32 g (89% yield) of a white fluffy solid were obtained. This material had an inherent viscosity of 0.42 dL/g in $H_2SO_4$ (0.4 wt. %) at 30° C. The glass transition temperature was found to be 153° C. as measured by DSC. Thermal gravimetric analysis found 1% decomposition in nitrogen at 359° C. and in air at 318° C.

TABLE 1

| | Comparison of Thermal Properties of Polyaramides and Polyamides | | | | |
|---|---|---|---|---|---|
| Example No. | Polymer | IV[a] | $T_g$ (°C.) | TGA (°C.) Nitrogen | Air |
| A | Isophthalic acid + 2,6-diaminotoluene | 0.69[b] | 268 | 385 | 362 |
| 2 | Isophthalic acid + 2,6-diamino-4-t-butyltoluene | 0.79[c] | 291 | 422 | 373 |
| B | 5-t-butylisophthalic acid + 2,6-diaminotoluene | 0.60[b] | 295 | 382 | 373 |
| 3 | 5-t-butylisophthalic acid + 2,6-diamino-4-t-butyltoluene | 0.69[b] | 307 | 431 | 371 |
| C | Terephthalic acid + 2,6-diaminotoluene | 1.4[c] | 297 | 422 | 387 |
| 4 | Terephthalic acid + 2,6-diamino-4-t-butyltoluene | 0.98[c] | 307 | 459 | 377 |
| D | Adipic acid + 2,6-diaminotoluene | 0.42[c] | 153 | 359 | 318 |
| 5 | Adipic acid + 2,6-diamino-4-t-butyltoluene | 0.49[c] | 190 | 371 | 345 |

[a]Inherent Viscosity measured at 0.4 wt. % and 30° C.
[b]Solvent DMAC
[c]Solvent $H_2SO_4$ The glass transition temperatures of the polyamides and polyaramides based on 2,6-diamino-4-t-butyltoluene were found to be 10°–37° C. higher than those from 2,6-diaminotoluene.

Examples 6–11 and Comparative Example E

In the following examples polyimides and a polyamide-imide were prepared from 2,6-diamino-4-t-butyltoluene. The polyimides were prepared by the reaction between the diamine and 3,3',4,4'-tetracarboxybenzophenone dianhydride, 2,2-bis(3,4-dicarboxyphenyl)propane dianhydride (IPAN), 2,2-bis(3,4-dicarboxyphenyl)hexafluoropropane dianhydride (6FDA), and 3,3',4,4'-tetracarboxybiphenyl dianhydride. The polyamide-imide was prepared from the diamine and trimellitic anhydride acid chloride.

All polymers described herein were prepared by reaction of the diamine with the dianhydride or anhydride acid chloride in solution. The solvent in all cases was N-methylpyrrolidone (NMP). The process is a two-stage polymerization. During the first stage, a polyamic acid or polyamide-amic acid is formed by reaction between the two starting materials. The second stage is imidization of the amic acid groups which is accomplished either chemically by using, for example, pyridine and acetic anhydride, or thermally by heating to about 300° C. Polymer inherent viscosities reported here were measured in NMP solvent using diluted aliquots of the reaction mixture.

Example 6

40.88 g of 2,6-diamino-4-t-butyltoluene (0.230 mole) and 76.10 g 3,3',4,4'-tetracarboxybenzophenone dianhydride (0.236 mole) were weighed into a 2 L reaction vessel. After the vessel plus starting materials had been purged with nitrogen for 20 min, 1 L of N-methylpyrrolidone (NMP), which had been cooled in an ethylene glycol/dry ice bath, was added. The mixture was stirred and allowed to warm to room temperature. The stirring was continued for 3 hr to give an NMP solution of a polyamic acid. A 1.25 mL aliquot of the solution was withdrawn, diluted to a total volume of 25 mL with NMP and used to determine the inherent viscosity of the polyamic acid. To the remainder of the reaction product, about 48 mL of pyridine were added and 30 minutes later, 48 mL of acetic anhydride were added. The stirring continued overnight. A 1.47 mL aliquot of the resulting polyimide solution was then diluted with enough NMP to give a 25 mL total solution volume, and the inherent viscosity of the polyimide was determined.

The polyimide was precipitated by pouring it into a water/methanol mixture in a blender, separated from the liquid, refluxed in water/methanol for about 3 hr and dried. The inherent viscosities of the polyamic acid and polyimide were, respectively, 0.71 and 0.74 dL/g. This polyimide product was soluble in NMP and was designated Example 6.

Example 7

The procedure of Example 6 was repeated except that 43.31 g of the diamine was used and the benzophenone dianhydride was replaced with 71.46 g of 3,3',4,4'-tetracarboxybiphenyl dianhydride. The dianhydride:diamine mole ratio in this example was 1:1. The inherent viscosities of the polyamic acid and polyimide were 0.66 and 1.01 dL/g, respectively. The product was designated Example 6.

Example 8

The procedure of Example 6 was repeated except that 3.788 g of the diamine and 6.252 g of 3,3',4,4'-tetracarboxybiphenyl dianhydride were used and a film was cast from the polyamic acid solution which was thermally imidized by heating to about 300° C. The inherent viscosities of the polyamic acid and polyimide were 0.66 and 1.01 dL/g, respectively, and its $T_g$ measured 368° C. The product was designated Example 8.

Example 9

The procedure of Example 8 was repeated except that 2.865 g (0.0161 mol) of the diamine was used and the benzophenone dianhydride was replaced with 7.140 g of 2,2-bis(3,4-dicarboxyphenyl)hexafluoropropane dianhydride. The dianhydride:diamine mole ratio in this case was 1:1. The inherent viscosity of the polyimide was 0.93 dL/g and its $T_g$ measured 335° C. The product was designated Example 9.

Example 10

The procedure of Example 8 was repeated except that 2.870 g (0.0161 mol) of the diamine was used and the benzophenone dianhydride was replaced with 5.416 g of 2,2-bis(3,4-dicarboxyphenyl)propane dianhydride. The dianhydride:diamine mole ratio in this case was 1:1. The inherent viscosity of the polyimide was 0.93 dL/g and its $T_g$ measured 335° C. The product was designated Example 10.

Example 11

The procedure of Example 6 was repeated except that trimellitic anhydride acid chloride was used instead of benzophenone dianhydride. The amounts of materials used are listed below:

| | |
|---|---|
| 2,6-diamino-4-t-butyltoluene | 5.26 g (0.0295 mole) |
| trimellitic anhydride acid chlorine | 6.40 g (0.0304 mole) |
| NMP | 100 mL |

This reaction was run in a 200 mL reaction vessel. 6.14 mL each of pyridine and acetic anhydride were used to chemically imidize the polyamide-amic acid intermediate. The inherent viscosity of the polyamide-imide measured 0.27 dL/g. This polyamide-imide was soluble in NMP and was designated Example 11.

Comparative Example E

A polyimide was prepared from oxybisaniline and 3,3',4,4'-tetracarboxybenzophenone dianhydride in NMP by a method similar to that described in Example 6 above. A 200 mL reaction vessel was used, and the amounts of materials are listed below:

| | |
|---|---|
| oxybisaniline | 4.40 g (0.0220 mole) |
| benzophenone dianhydride | 7.08 g (0.0220 mole) |
| NMP | 100 mL |

4.6 mL each of pyridine and acetic anhydride were used to chemically imidize the product. The inherent viscosity of the polyamic acid was 1.27 dL/g. However, the inherent viscosity of the polyimide, which was designated Comparative Example E, was not measured because this product gelled. The behavior of this polyimide demonstrates one advantage polyimides containing 2,6-diamino-4-t-butyltoluene have over other polyimides or polyamide/imides: enhanced solubility in organic solvents.

TABLE II

Comparison of Thermal Properties of Polyimides and Polyamide-imides

| Example No. | Polycarboxylic Acid Compound | IV[a] | $T_g$ (°C.) | TGA (°C.) Nitrogen | TGA (°C.) Air |
|---|---|---|---|---|---|
| 6 | BTDA | 0.74 | 331 | 477 | 428 |
| E | BTDA | gel | 275 | 544 | 516 |
| 7 | BPDA | 1.01 | 372 | 510 | 428 |
| 8 | BPDA | — | 368 | 488 | 455 |
| 9 | 6FDA | 0.93 | 335 | 496 | 461 |
| 10 | IPAN | 0.52 | 375 | 501 | 430 |
| 11 | TMAC | 0.27 | 332[b] | 398 | 370 |

[a]Inherent Viscosity measured in NMP at 0.4 wt. % and 30° C.
[b]A temperature ramp rate of 50° C. min was used.

We claim:

1. A resinous condensation polymer of a polycarboxylic acid compound and an aromatic diprimary amine comprising a diamino-t-butyltoluene.

2. The polymer of claim 1 wherein the aromatic diprimary amine is at least one diamino-t-butyltoluene having amino groups meta or para to each other on the benzene ring.

3. The polymer of claim 2 comprising an at least partially soluble, film-forming polyamide of at least one diamino-t-butyltoluene selected from the group consisting of 3,5-diamino-2-t-butyltoluene, 3,6-diamino-2-t-butyltoluene, 4,6-diamino-2-t-butyltoluene, 2,4-diamino-3-t-butyltoluene, 2,5-diamino-3-t-butyltoluene, 2,6-diamino-3-t-butyltoluene, 4,6-diamino-3-t-butyltoluene, 2,5-diamino-4-t-butyltoluene, 3,5-diamino-4-t-butyltoluene, and 2,6-diamino-4-t-butyltoluene, and a compound selected from a group consisting of organic diacids, diesters and diacyl chlorides.

4. The polyamide of claim 3 wherein the compound is selected from the group consisting of diacyl chlorides of benzene, t-butylbenzene, biphenyl, diphenylether, and naphthalene.

5. The polyamide of claim 4 wherein the compound is the diacyl chloride of biphenyl, t-butylbenzene, diphenylether, or naphthalene.

6. The polyamide of claim 4 wherein the compound is 5-t-butylisophthaloyl dichloride or 2,6-naphthoyl dichloride.

7. The polyamide of claim 3, or claim 4, or claim 5, or claim 6 wherein the diamino-t-butyltoluene is 2,6-diamino-4-t-butyltoluene.

8. A resinous condensation polymer of an aromatic diprimary amine comprising a diamino-t-butyltoluene and at least one carboxylic acid compound selected from the group consisting of carboxylic diacids, diesters, and diacyl chlorides.

* * * * *